United States Patent
Chen

(10) Patent No.: US 11,586,758 B2
(45) Date of Patent: Feb. 21, 2023

(54) AUTHORIZATION METHOD FOR FORM DATA ACQUIRED BASED ON ROLE

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

(*) Notice: Subject to any disclaimer, the term of this patent is extended or adjusted under 35 U.S.C. 154(b) by 346 days.

(21) Appl. No.: 16/630,829

(22) PCT Filed: Jul. 12, 2018

(86) PCT No.: PCT/CN2018/095513
§ 371 (c)(1),
(2) Date: Jan. 13, 2020

(87) PCT Pub. No.: WO2019/011304
PCT Pub. Date: Jan. 17, 2019

(65) Prior Publication Data
US 2020/0143077 A1    May 7, 2020

(30) Foreign Application Priority Data
Jul. 13, 2017 (CN) .......................... 201710571694.8

(51) Int. Cl.
| | | |
|---|---|---|
| G06F 21/00 | (2013.01) | |
| G06F 21/62 | (2013.01) | |
| G06F 40/166 | (2020.01) | |
| G06F 3/0482 | (2013.01) | |
| G06F 3/0484 | (2022.01) | |

(Continued)

(52) U.S. Cl.
CPC ........ G06F 21/6227 (2013.01); G06F 3/0482 (2013.01); G06F 3/0484 (2013.01);
(Continued)

(58) Field of Classification Search
CPC .. G06F 21/6227; G06F 40/166; G06F 3/0482; G06F 3/0484; G06F 21/30;
(Continued)

(56) References Cited

U.S. PATENT DOCUMENTS

| | | | |
|---|---|---|---|
| 2012/0240194 A1* | 9/2012 | Nack Ngue ........... | G06F 21/604 726/28 |
| 2014/0157350 A1* | 6/2014 | Wang .................. | G06F 21/6218 726/1 |
| 2016/0142387 A1* | 5/2016 | Lockhart ............... | H04L 63/061 713/171 |

FOREIGN PATENT DOCUMENTS

| | | |
|---|---|---|
| CN | 101673375 A | 3/2010 |
| CN | 102468971 A | 5/2012 |

(Continued)

OTHER PUBLICATIONS

International Search Report in the international application No. PCT/CN2018/095513, dated Sep. 27, 2018.
(Continued)

*Primary Examiner* — Yogesh Paliwal
(74) *Attorney, Agent, or Firm* — Ladas & Parry, LLP

(57) ABSTRACT

An authorization method based on form data gotten by a role is disclosed in the present invention, including: selecting one or more grantees; selecting a form, and displaying an authorized field used for searching form data; displaying all roles in a system, defining a role that needs to be used for searching form data as a target role, and selecting a target object for each target role respectively, where the target object is a current object, a historical object, or all objects; defining a target role and a user or an employee in its target object as a limited value; for each target role of each authorized field, respectively getting a set of form data, any limited value of the target role of which is included by a field value of the authorized field in the form, and authorizing an operation permission to the set. The present invention achieves dynamic authorization of form data, so that related permissions can be adjusted automatically in the resignation, transfer, induction of the employees and other cases, thus reducing workloads of the authorization operation and making it less error-prone.

9 Claims, 7 Drawing Sheets

(51) Int. Cl.
*G06F 21/30* (2013.01)
*G06Q 10/105* (2023.01)
*H04L 9/40* (2022.01)

(52) U.S. Cl.
CPC ............ *G06F 21/30* (2013.01); *G06F 40/166* (2020.01); *G06Q 10/105* (2013.01); *H04L 63/105* (2013.01); *G06F 2221/2141* (2013.01)

(58) Field of Classification Search
CPC .......... G06F 2221/2141; G06F 21/604; G06F 21/6218; G06F 21/6245; G06Q 10/105; H04L 63/105; H04L 63/102
See application file for complete search history.

(56) References Cited

FOREIGN PATENT DOCUMENTS

| | | |
|---|---|---|
| CN | 104091130 A | 10/2014 |
| CN | 104463005 A | 3/2015 |
| CN | 104517186 A | 4/2015 |
| CN | 107340951 A | 11/2017 |

OTHER PUBLICATIONS

Written Opinion of the International Searching Authority in the international application No. PCT/CN2018/095513 dated Sep. 27, 2018 with English translation provided by Google Translate.

Notification to Grant Patent Right for Invention from Chinese Patent Application No. 201810766311.7 dated Feb. 7, 2021, and it English translation from Global Dossier.

Office action from Chinese Patent Application No. 201810766311.7 dated Apr. 22, 2020 with Search Report, and its English translation from Global Dossier.

PCT International Preliminary Report on Patentability Chapter II from PCT/CN2018/095513 dated Oct. 14, 2019, and its English translation from WIPO.

* cited by examiner

-Prior Art-

-Prior Art-

-Prior Art-

| Grantee | Form | Creator | Current object | Historical object | All objects | View | Modify | ...... |
|---|---|---|---|---|---|---|---|---|
| General manager office ✓ Clerk 1 Clerk 2 Clerk 3 ...... | Customer ✓ contract ...... | Unrestricted | | | | | | |
| | | Null | | | | | | |
| | | Salesperson 1 | ✓ | | | ✓ | | |
| | | Salesperson 2 | | ✓ | | ✓ | | |
| | | Salesperson 3 | | | ✓ | | ✓ | |
| | | ...... | | | | ...... | ...... | |

| Grantee | Form | Creator | Current object (✓) | Historical object | All objects | View | Modify | ... |
|---|---|---|---|---|---|---|---|---|
| General manager office ✓ Clerk 1 Clerk 2 Clerk 3 .... | Customer ✓ contract ..... | Unrestricted | | | | | | |
| | | Null | | | | | | |
| | | Salesperson 1 | | | | ✓ | | |
| | | Salesperson 2 | | | | ✓ | | |
| | | Salesperson 3 | | | | | ✓ | |
| | | ..... | | | | ..... | ..... | |

FIG. 8

| Grantee | Form | Creator | View | Modify | ...... |
|---|---|---|---|---|---|
| General manager office<br>✓ Clerk 1<br>　Clerk 2<br>　Clerk 3<br><br>...... | Customer<br>✓ contract<br><br>...... | Unrestricted | | | |
| | | Null | | | |
| | | Salesperson 1 | ✓ | | |
| | | Salesperson 2 | ✓ | | |
| | | Salesperson 3 | | ✓ | |
| | | ...... | ...... | ...... | |

FIG. 10

AUTHORIZATION METHOD FOR FORM DATA ACQUIRED BASED ON ROLE

CROSS-REFERENCE TO RELATED APPLICATIONS

This application is the U.S. national phase of PCT/CN2018/095513, filed on Jul. 12, 2018, which claims priority to Chinese Application No. 201710571694.8 filed on Jul. 13, 2017, the disclosures of which are incorporated by reference herein in their entireties.

BACKGROUND

Technical Field

The present invention relates to a method for creating/authorizing forms in management software such as ERP, and in particular, to an authorization method based on form data gotten by a role.

Related Art

Role-based access control (RBAC) is one of the most researched and mature permission management mechanisms for databases in recent years. It is considered to be an ideal candidate to replace conventional mandatory access control (MAC) and discretionary access control (DAC). The basic idea of role-based access control (RBAC) is to divide different roles according to different functional positions in the enterprise organization view, encapsulate the access permission of database resources in roles, and allow users to indirectly access database resources by assigning different roles to the users.

A large number of tables and views are often built in large-scale application systems, which makes the management and permissions of database resources very complicated. It is very difficult for a user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the permission management of the system, and makes the permission management of the system more compliant with the business management specifications of the application system.

However, the conventional role-based user permission management method adopts the "role-to-user one-to-many" relation mechanism, where the "role" has the nature of a group/a class. That is, one role can simultaneously correspond to/be related to multiple users, and the role is similar to a post/a position/a type of work or other concepts. The permission authorized to a user under this relation mechanism is basically divided into the following three forms: 1. As shown in FIG. 1, the permission is directly authorized to the user, where the disadvantage is that the workload is large and the operation is frequent and cumbersome. 2. As shown in FIG. 2, the role (having the nature of a class/a group/a post/a type of work) is authorized (one role may be related to multiple users), the user obtains permissions through its role. 3. As shown in FIG. 3, the above two methods are combined.

In the above descriptions, as both 2 and 3 need to authorize the role that has the nature of a class/a group. The way of authorization through the role having the nature of a class/a group/a post/a type of work has the following disadvantages: 1. Operations are difficult when the user's permission has changed. In the actual process of using a system, the user's permissions often need to be adjusted during the operation process. For example, in processing the change in an employee's permissions, when the permissions of an employee related to the role have changed, it is improper to change the permissions of the entire role due to the change in the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

2. It is difficult to remember the specific permissions contained in a role for a long time. If the role has many permission function points, as time goes by, it is difficult to remember the specific permissions of the role, and it is even more difficult to remember the permission differences between roles with similar permissions. If a new user needs to be related, it is impracticable to accurately determine how to select a relation.

3. Because user's permissions change, more roles will be created (if new roles are not created, direct authorization to the user will be increased greatly), and it is more difficult to distinguish specific differences between the permissions of the roles.

4. When a user is transferred from a post, if many permissions of the transferred user need to be assigned to other users, it is necessary to distinguish the permissions of the transferred user and create roles to relate to the other users respectively during processing. Such operations are not only complicated and time-consuming, but also prone to errors.

In the conventional authorization control of form data based on a field having the nature of an employee, if there are a large number of employees (for example, 500 employees), the situations such as the resignation, induction, and transfer of the employees continue arising dynamically at any time, which makes the authorization operation very complicated and involves tremendous workloads. Moreover, in the case of the resignation, induction, and transfer of the employees, the original related authorization needs to be modified, and as a result, the authorization involves tremendous workloads, and is complicated and prone to errors.

In the conventional authorization control of form data based on a field having the nature of a user, because the conventional system does not establish a fixed one-to-one relationship between users and employees, it exists that multiple employees may log into the system as one user. When the form data is saved, the field value of the field thereof having the nature of a user can only record an operating user, but it cannot be accurately recorded and distinguished whether the employee corresponding to the operating user is Zhang San or Li Si, which makes it difficult to know the employee corresponding to the operating user clearly and accurately when the data is viewed subsequently.

In the conventional authorization method, the dynamic authorization cannot be done, merely to view the related work of current employees/users with some post numbers, not to view the related work of historical employees/users with these post numbers, or on the contrary, the dynamic authorization can be done, to view the related work of historical employees/users with some post numbers, not to view the related work of current employees/users with these post numbers.

SUMMARY

Technical Problems

The object of the present invention is to overcome the deficiencies of the prior art, and provide an authorization method based on form data gotten by a role, which achieves the dynamic authorization of form data, so that related permissions can be adjusted automatically during the resignation, transfer, and induction of employees, thus reducing workloads of the authorization operation and making it less error-prone.

Solutions to Problems

Technical Solutions

The object of the present invention is achieved by the following technical solutions: An authorization method based on form data gotten by a role includes:

(1) selecting one or more grantees;

(2) selecting a form, and displaying an authorized field used for searching form data, where said authorized field is a field, the field value of which includes a user or an employee;

(3) authorizing each authorized field respectively: displaying all roles in a system, wherein said role is an independent individual not a group/a class, one role can only be related to a unique user during the same period, and one user is related to one or more roles; defining a role that needs to be used for searching form data as a target role, where one target role corresponds to one role; selecting a target object for each target role respectively, where said target object is a current object, a historical object, or all objects, said current object is a user currently related to the role or an employee corresponding to the user, said historical object is all users who have been related to the role except the user currently related to the role or employees corresponding to the users, and said all objects are all users who have been related to the role or employees corresponding to the users; and (4) for each target role of each authorized field, getting a set of form data, any user or employee of the target object of the target role of which is included by a field value of the authorized field in said form, respectively, and authorizing an operation permission to the set.

Steps (2), (3), and (4) are performed sequentially, and step (1) is performed before step (2), or performed between step (2) and step (3), or performed between step (3) and step (4), or performed after step (4).

An authorization method based on form data gotten by a role includes:

(1) selecting one or more grantees;

(2) selecting a form, and displaying an authorized field used for searching form data, where said authorized field is a field, the field value of which includes a role and a user, or a role and an employee;

(3) authorizing each authorized field respectively: displaying all roles in a system, where said role is an independent individual not a group/a class, one role can only be related to a unique user during the same period, and one user is related to one or more roles; defining a role that needs to be used for searching form data as a target role, where one target role corresponds to one role; selecting a target object for each target role respectively, where said target object is a current object, a historical object, or all objects, said current object is a user currently related to the role or an employee corresponding to the user, said historical object is all users who have been related to the role except the user currently related to the role or employees corresponding to the users, and said all objects are all users who have been related to the role or employees corresponding to the users; and defining a target role and a user or an employee in the target object of the target role as a limited value of the target role;

(4) for each target role of each authorized field, getting a set of form data, any limited value of the target role of which is included by a field value of the authorized field in said form, respectively, and authorizing an operation permission to the set.

Steps (2), (3), and (4) are performed sequentially, and step (1) is performed before step (2), or performed between step (2) and step (3), or performed between step (3) and step (4), or performed after step (4).

Preferably, said operation permission includes one or more operations of viewing, modifying, adding, deleting and printing form data.

Preferably, said user determines (obtains) permissions through its relation to the role, one employee corresponds to one user, and one user corresponds to one employee.

Preferably, said role belongs to a certain department, the role is authorized according to the work content of the role, the name of the role is unique under the department, and the number of the role is unique in the system.

Preferably, during cross-department transfer of said user, the user's relation to the role in the original department is canceled, and the user is related to a role in a new department.

Preferably, a null option is displayed when all roles in the system are displayed, and if the null option is selected, the operation permission is authorized to the form data in which the field value of the authorized field in said form is null.

Preferably, an unrestricted option is displayed when all roles in the system are displayed, and if the unrestricted option is selected, the operation permission is authorized to the form data in which the field value of the authorized field in said form is any value.

Preferably, said grantee includes one or more types of a person, a user, a group, a class, and a role, said role is an independent individual not a group/a class, one role can only be related to a unique user during the same period, and one user is related to one or more roles.

An authorization method based on form data gotten by a role includes:

(1) selecting one or more grantees;

(2) selecting a form, and displaying an authorized field used for searching form data, where said authorized field is a field, the field value of which includes a role, said role is an independent individual not a group/a class, one role can only be related to a unique user during the same period, and one user is related to one or more roles; and (3) authorizing each authorized field respectively: displaying all roles in a system, where said role is an independent individual not a group/a class, one role can only be related to a unique user during the same period, and one user is related to one or more roles; defining a role that needs to be used for searching form data as a target role, where one target role corresponds to one role; and for each target role of each authorized field, getting a set of form data, the target role of which is included by a field value of the authorized field in said form, respectively, and authorizing an operation permission to the set.

Steps (2) and (3) are performed sequentially, and step (1) is performed before step (2), or performed between step (2) and step (3), or performed after step (3).

Beneficial Effects of the Invention

Beneficial Effects

The present invention has the following beneficial effects:
(1) The present invention achieves dynamic authorization of form data, so that the related permissions can be adjusted automatically in the case of the resignation, transfer, induction of employees, and other cases, thus reducing the workloads of the authorization operation and making it less error-prone. For example, the supervisor 1 of a sales department I is authorized to view (view as a reimbursing applicant) the personal expense account of an employee currently with a certain post number under the department. If an employee Zhang San currently related to the post number is replaced by Li Si, the supervisor 1 automatically can only view the personal expense account of the latest employee Li Si (the reimbursing applicant is Li Si) related to the post number, and automatically cannot view the personal expense account of the employee Zhang San (the reimbursing applicant is Zhang San) originally related to the post number. For another example, the housekeeping supervisor 1 of a company is only authorized to view (view as a reimbursing applicant) the personal expense account of employees historically related to a certain post number, so as to carry out the related analysis about all the employees (excluding the currently related employee) who have been related to the post number. If the employee Zhang San currently related to the post number no longer works with the post number (the Zhang San's relation to the post number/role is canceled), the housekeeping supervisor 1 can automatically view the personal expense account of Zhang San and carry out the related analysis. For another example, a general manager 1 of the company is authorized to view (view as a reimbursing applicant) the personal expense accounts of all employees related to a certain post number. After the employee Zhang San currently related to the post number is replaced by Li Si, the general manager 1 can automatically view Li Si's personal expense account (and can also view Zhang San's personal expense account).

The conventional authorization method is complicated, and cannot realize collective authorization for data corresponding to a person currently with a post number, a person who has worked with the post number, or all persons who have worked with the post number, not to mention automatic dynamic. The present invention achieves collective authorization easily and quickly by means of a current object, a historical object, and all objects, and can achieve an automatic dynamic correspondence function.

(2) The role in the present invention is an independent individual not a group/a class, one role can only be related to a unique user during the same period, and one user is related to one or more roles. One user is related to one employee, and one employee is related to one user. During operation of an enterprise or an institution, the role rarely changes, and the role even remains unchanged in a relatively long period of time. In the case of the resignation, transfer and induction of an employee, the authorization can be completed by canceling the relation to the related role or relating to a new role. The authorization operation is simple, convenient, and highly efficient, which greatly improves the authorization efficiency.

(3) In the present invention, the form data that needs to be authorized is gotten through a role and a user related to the role, or a role and an employee corresponding to a user related to the role, so that the permissions of the different responsibilities of an employee can be effectively distinguished when the form data is authorized. For example, Zhang San is currently related to a role 1 under an aircraft business department and a role 2 under a home appliance business department, the permission to view Zhang San's home appliance contract form needs to be authorized to a manager 1 of the home appliance business department now, and a contract signer field is selected as an authorized field. If the manager 1 is authorized according to the conventional employee-based authorization method and the field value of the contract signer is authorized to be Zhang San, the manager 1 of the home appliance business department can view all home appliance contracts and aircraft contracts in which the contract signer fields are Zhang San. As a result, the manager 1 of the home appliance business department can view the aircraft contracts signed by Zhang San, which causes information leakage of the aircraft contracts. When the manager 1 of the home appliance business department is authorized using the method in the present invention, and the field value of the contract signer field is authorized to be Zhang San (role 2), the manager 1 of the home appliance business department can only view the home appliance contracts signed by Zhang San (role 2), but cannot view the aircrafts contracts signed by Zhang San (role 1), thus achieving refined management and ensuring the information security of the company.

(4) The conventional permission management mechanism defines the nature of a group, a type of work, a class or the like as the role. The role is in a one-to-many relation to the user. In the actual process of using a system, the user's permissions often need to be adjusted during the operation process. For example, in processing the change of an employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (after the permissions of the user/role have changed dynamically), the solutions in the present application can significantly improve the permission management efficiency for the system user in using the system, make the dynamic authorization simpler, more convenient, clearer and more explicit, and improve the efficiency and reliability of the permission setting.

(5) The conventional group-based role authorization method is prone to errors. The method provided in the present application significantly reduces the probability of authorization errors, because the method of the present application only needs to consider the role as an independent individual, without considering the commonality of multiple users related to the role having the nature of a group under the conventional method. Even if the authorization errors occur, only the user related to the role is affected. However, in the case of the conventional role having the nature of a group, all users related to the role are affected. Even if the authorization errors occur, the correction method in the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

(6) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(7) When a user is transferred from a post, if many permissions of the transferred user need to be assigned to other users, in processing, it is necessary to distinguish the permissions of the transferred user and creating roles to relate to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and less error-prone.

(8) The role belongs to a department, and then the department to which the role belongs cannot be replaced. Reasons why the department to which the role belongs cannot be replaced are as follows. Reason 1: As the role in the present application is equivalent to a station number/a post number in nature, different station numbers/post numbers have different work content/permissions. For example, the role of a salesperson 1 under a sales department and the role of a developer 1 under a technical department are two completely different station numbers/post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

BRIEF DESCRIPTION OF THE DRAWINGS

Description of the Drawings

Figure 1:
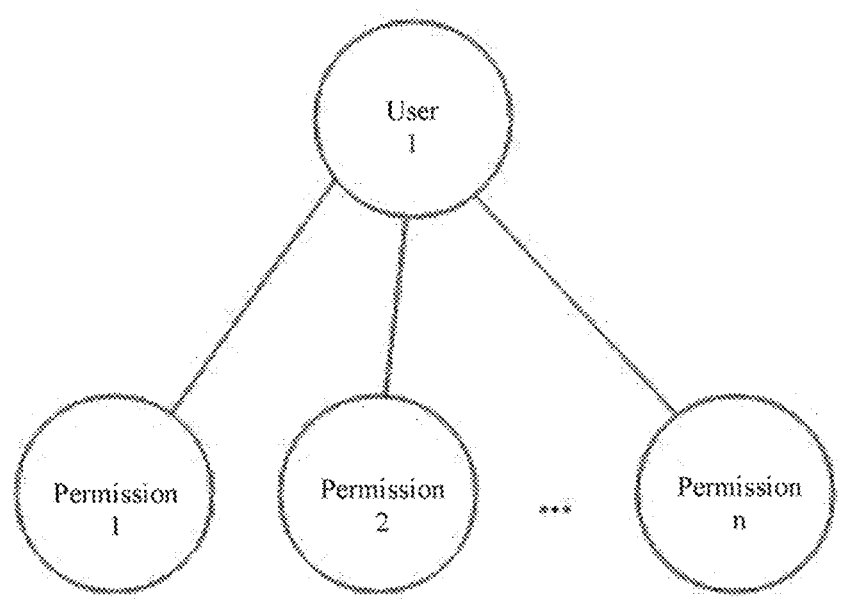
Figure 2:
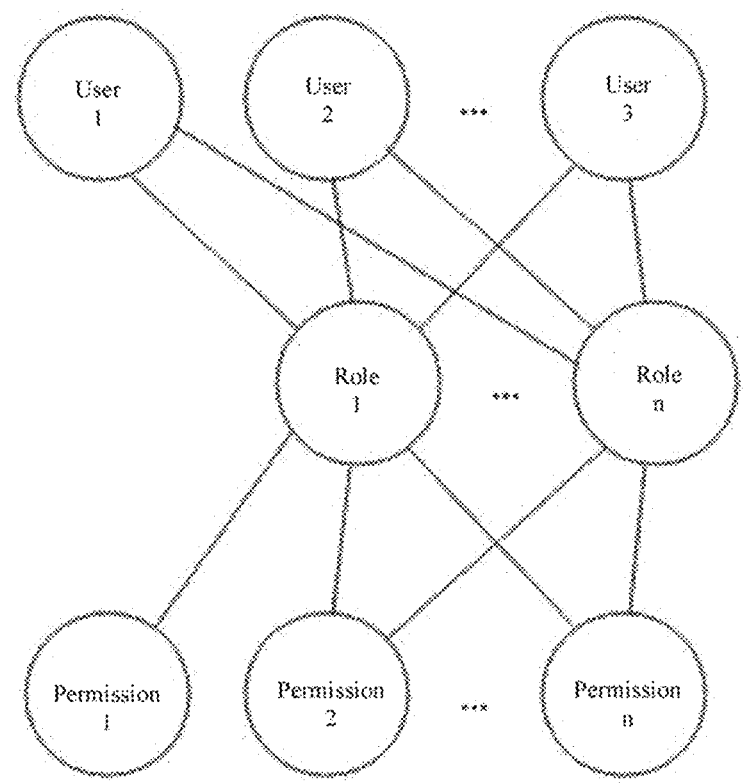
Figure 3:
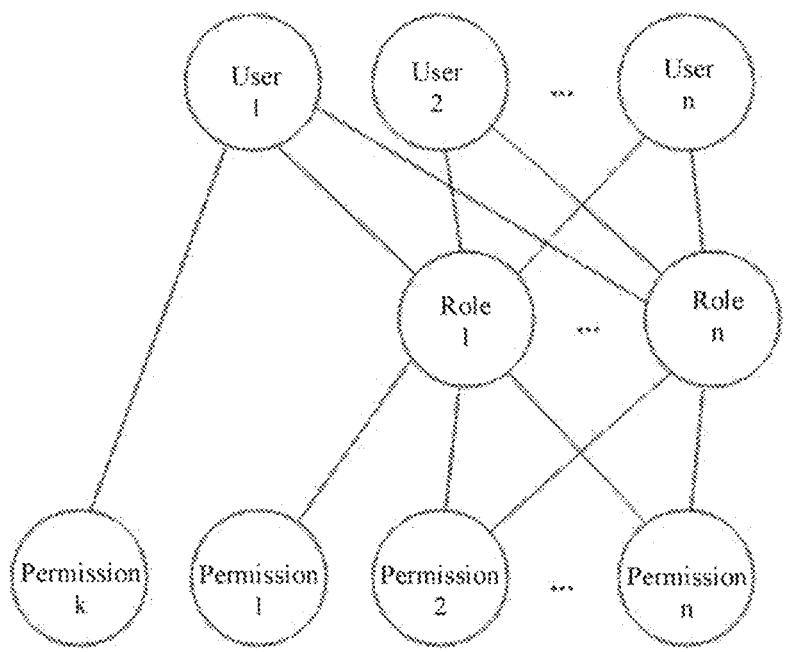
Figure 4:
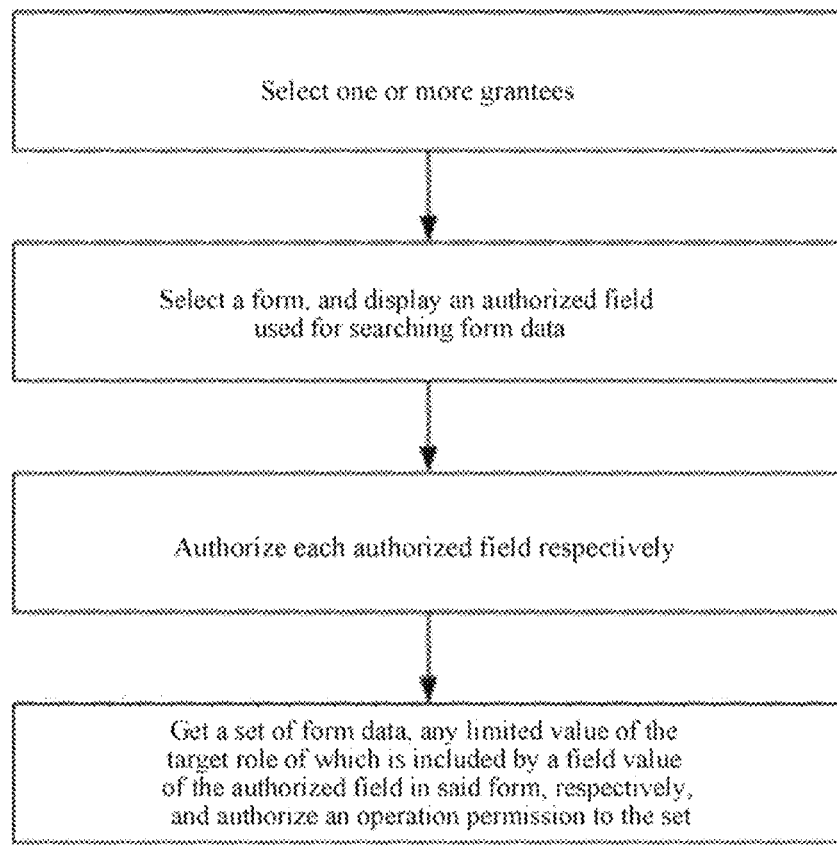
Figures 5, 6:
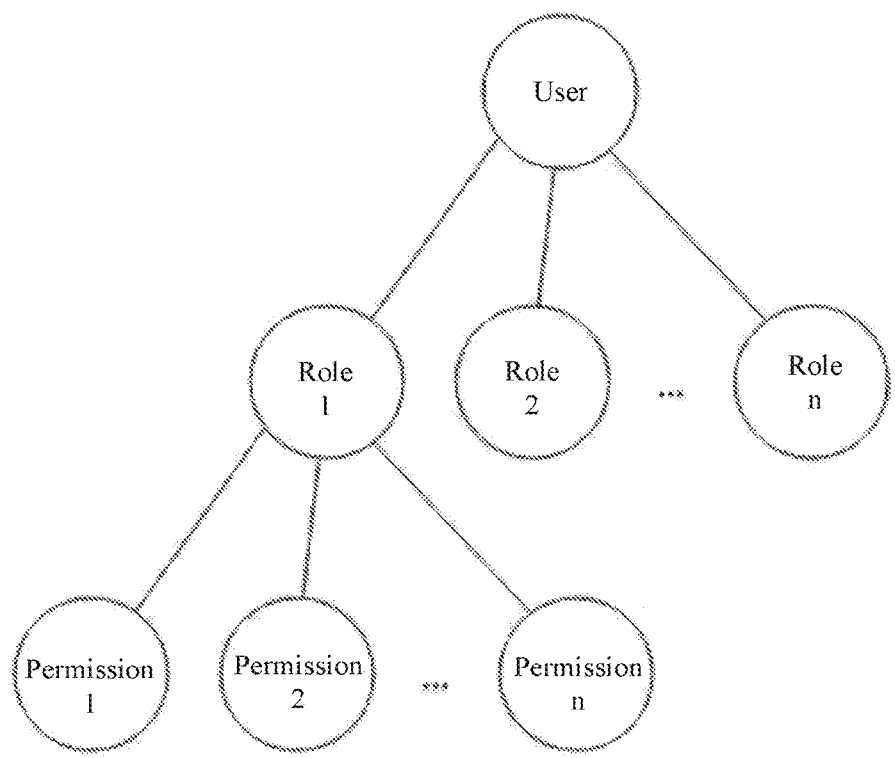
Figure 7:
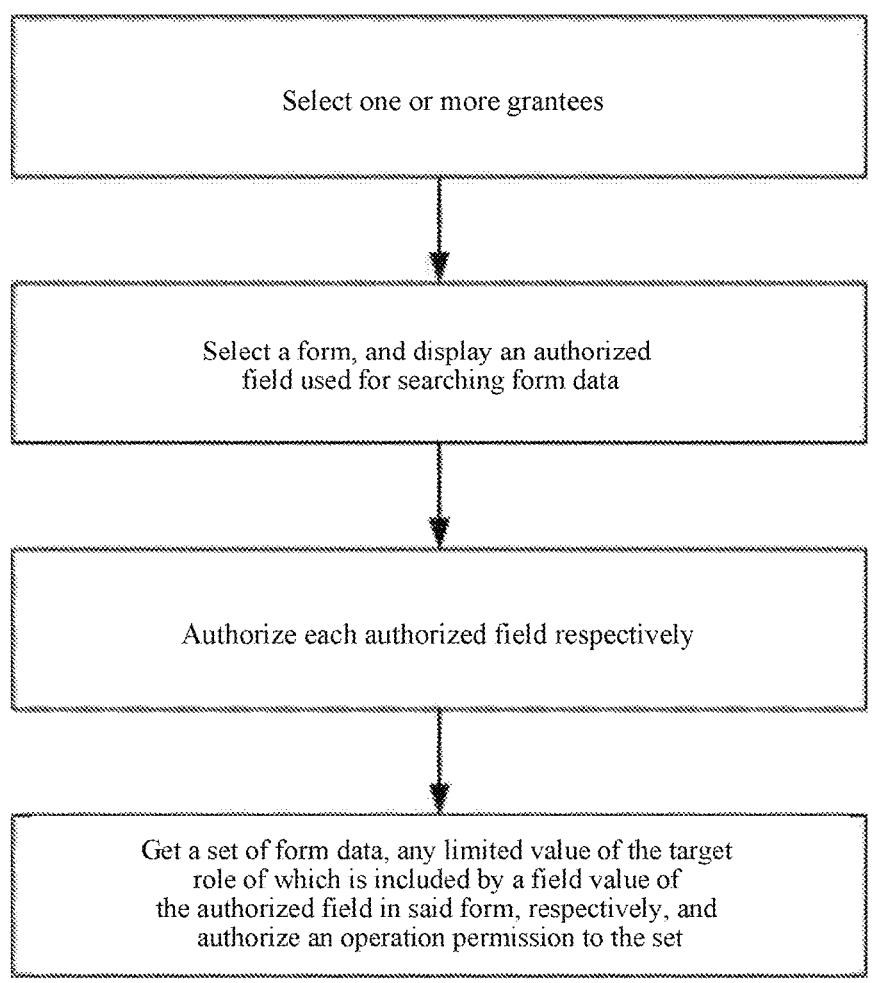
Figure 9:
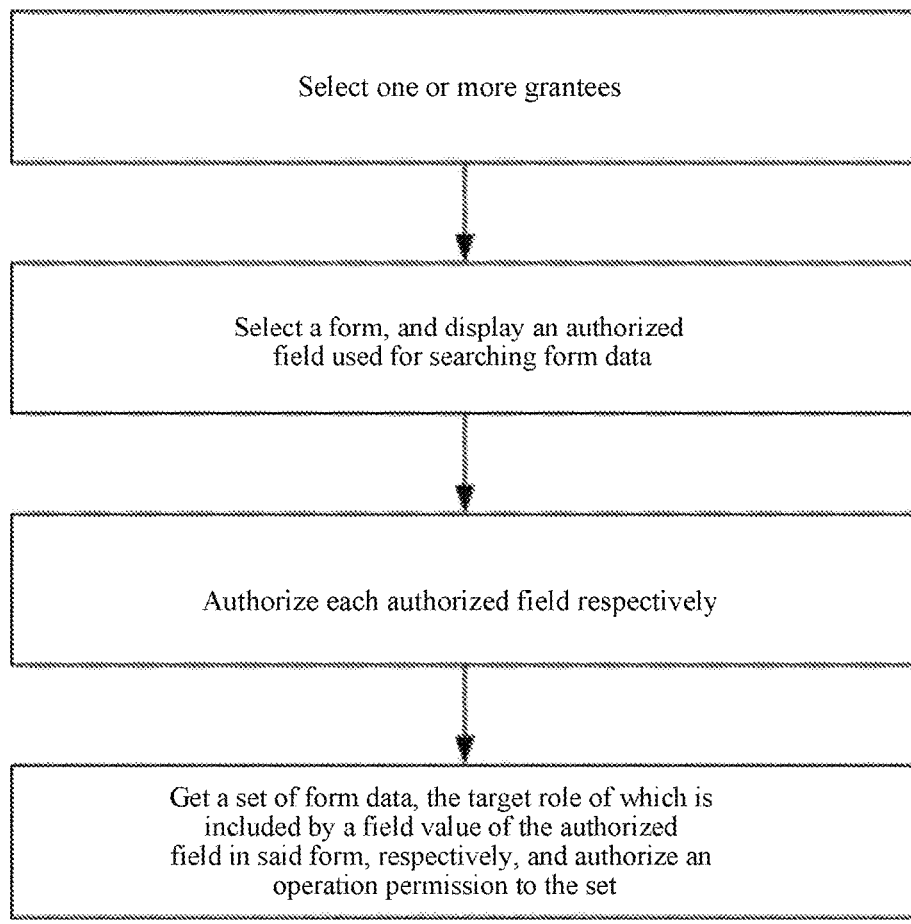

FIG. 1 is a schematic diagram in which a system directly authorizes a user in the prior art;

FIG. 2 is a schematic diagram in which a system authorizes a role having the nature of a group/a class in the prior art;

FIG. 3 is a schematic diagram in which a system both directly authorizes a user and a role having the nature of a group/a class in the prior art;

FIG. 4 is a flowchart of an embodiment in the present invention;

FIG. 5 is a schematic diagram in which a system authorizes a user through a role having the nature of an independent individual according to the present invention;

FIG. 6 is a schematic diagram of a form in the present invention;

FIG. 7 is a flowchart of another embodiment in the present invention;

FIG. 8 is a schematic diagram of a form when a header is checked;

FIG. 9 is a flowchart of still another embodiment in the present invention; and

FIG. 10 is a schematic diagram of a form when a role is selected to be authorized.

DETAILED DESCRIPTION

Description of Embodiments

The technical solutions of the present invention will be further described in detail below with reference to the figures, but the protection scope of the present invention is not limited to the following descriptions.

Embodiment 1

As shown in FIG. 4, an authorization method based on form data gotten by a role includes: selecting one or more grantees. The grantee includes one or more types of a person, a user, a group, a class, and a role.

As shown in FIG. 5, the role is an independent individual not a group/a class, one role can only be related to a unique user during the same period, and one user is related to one or more roles.

The role belongs to a certain department, and the role is authorized according to the work content of the role; the name of the role is unique under the department, and the number of the role is unique in a system. The user determines (obtains) permissions through its relation to the role, one employee corresponds to one user, and one user corresponds to one employee.

Definition of a role: A role does not have the nature of a group/a class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

A form is selected, and an authorized field used for searching form data is displayed, where the authorized field is a field, the field value of which includes a user or an employee. As shown in FIG. 6, the authorized field is creator.

Each authorized field is authorized respectively: all roles in a system are displayed, where the role is an independent individual not a group/a class, one role can only be related to a unique user during the same period, and one user is related to one or more roles; a role that needs to be used for searching form data is defined as a target role, where one target role corresponds to one role (for example, if 5 roles need to be used for searching form data, there are 5 target roles correspondingly); a target object is selected for each target role respectively, where the target object is a current object, a historical object, or all objects, said current object is a user currently related to the role or an employee corresponding to the user, said historical object is all users who have been related to the role except the user currently related to the role or employees corresponding to the users, and said all objects are all users who have been related to the role or employees corresponding to the users.

As shown in FIG. 6, the current object is selected as the target object for a salesperson 1 (role), the historical object is selected as the target object for a salesperson 2 (role), all objects are selected as the target object for a salesperson 3 (role). If the salesperson 1 is currently related to a user A and has been related to a user B before, the target object of the salesperson 1 is the user A; if the salesperson 2 is currently related to a user C and has been related to a user D and a user E before, the target object of the salesperson 2 is the user D and the user E; if the salesperson 3 is currently related to a user F and has been related to a user G before, the target object of the salesperson 3 is the user F and the user G.

For each target role of each authorized field, the set of form data, any user or employee of the target object of the target role of which is included by a field value of the authorized field in the form is gotten respectively, and the operation permission is authorized to the set. According to the setting of the target object in the example above, the operation permission is authorized to form data in which the field value of the creator in the contract form includes the user A, the operation permission is authorized to form data in which the field value of the creator in the contract form includes the user D or the user E, and the operation permission is authorized to form data in which the field value of the creator in the contract form includes the user F or the user G.

The operation permission includes one or more operations of viewing, modifying, adding, deleting and printing form data.

Embodiment 2

As shown in FIG. 7, an authorization method based on form data gotten by a role includes: selecting one or more grantees. The grantee includes one or more types of a person, a user, a group, a class, and a role. The role is an independent individual not a group/a class, one role can only be related to a unique user during the same period, and one user is related to one or more roles.

The role belongs to a certain department, and the role is authorized according to the work content of the role; the name of the role is unique under the department, and the number of the role is unique in a system. The user determines (obtains) permissions through its relation to the role, one employee corresponds to one user, and one user corresponds to one employee.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

A form is selected, and an authorized field used for searching form data is displayed, where the authorized field is a field, the field value of which includes a role and a user, or a role and an employee; that is, the authorized field may be a field, the field value of which includes a role and a user, or may be a field, the field value of which is a role and an employee.

Each authorized field is authorized respectively: all roles in a system are displayed, where the role is an independent individual not a group/a class, one role can only be related to a unique user during the same period, and one user is related to one or more roles; a role that needs to be used for searching form data is defined as a target role, where one target role corresponds to one role (for example, if 5 roles need to be used for searching form data, there are 5 target roles correspondingly); a target object is selected for each target role respectively, where the target object is a current object, a historical object, or all objects, said current object is a user currently related to the role or an employee corresponding to the user, said historical object is all users who have been related to the role except the user currently related to the role or employees corresponding to the users, and said all objects are all users who have been related to the role or employees corresponding to the users; the target role and the user or the employee in the target object of the target role are defined as the limited value of the target role. If the target object of the target role includes multiple users or employees, the target role and the users or employees in the target object of the target role are defined as multiple limited values.

For example, the target object of the target role A includes three users: a user A, a user B, and a user C. In this case, the target role A and the user A are defined as a limited value "target role A (user A)", the target role A and the user B are defined as a limited value "target role A (user B)", and the target role A and the user C are defined as a limited value "target role A (user C)".

When the target object is selected for the role, if the column name of any one of the current object, the historical object, and all objects is selected (for example, the current object selected in FIG. 8), the target objects of all roles (including the roles to be added subsequently) are objects corresponding to the selected column name (one type of the current object, historical object, and all objects). For example, in FIG. 8, the column name of the current object is selected, the target objects of a salesperson 1, a salesperson 2, a salesperson 3 and the like are all their respective current objects. When all roles of the authorized field (including roles to be added subsequently) are target roles, and the target objects of these target roles are of the same type (that is, all the target objects are current objects, historical objects, or all objects), one-step selection can be achieved by selecting a corresponding column name (selecting a column name is merely a manifestation, the nature of this manifestation can also be achieved in other ways), thus greatly reducing the workloads of selecting the target objects for the target roles and improving the efficiency of the authorization operation.

As shown in FIG. 6, the current object is selected as the target object for a salesperson 1 (role), the historical object is selected as the target object for a salesperson 2 (role), all objects are selected as the target object for a salesperson 3 (role). If the salesperson 1 is currently related to a user A and has been related to a user B before, the target object of the salesperson 1 is the user A; if the salesperson 2 is currently related to a user C and has been related to a user D and a user E before, the target object of the salesperson 2 is the user D and the user E; if the salesperson 3 is currently related to a user F and has been related to a user G before, the target object of the salesperson 3 is the user F and the user G.

For each target role of each authorized field, the set of form data, any limited value of the target role of which is included by a field value of the authorized field in the form is gotten respectively, and the operation permission is authorized to the set. According to the setting of the target object in the example above, the salesperson 1 and the user A are defined as a first limited value, the salesperson 2 and the user D are defined as a first second value, the salesperson 2 and the user E are defined as a third limited value, the salesperson 3 and the user F are defined as a fourth limited value, and the salesperson 3 and the user G are defined as a fifth limited value. In this case, the operation permission is authorized to form data in which the field value of the creator in the contract form includes the first limited value (which may also be expressed as salesperson 1 (A)), the operation permission is authorized to form data in which the field value of the creator in the contract form includes the second limited value (which may also be expressed as salesperson 2 (D)) or the third limited value (which may also be expressed as salesperson 2 (E)), and the operation permission is authorized to form data in which the field value of the creator in the contract form includes the fourth limited value (which may also be expressed as salesperson 3 (F)) or the fifth limited value (which may also be expressed as salesperson 3 (G)). As shown in FIG. 6, a clerk 1 can view a contract created by "salesperson 1(A)" (if the user related to the role, such as the salesperson 1, changes from A to K, after the use has changed, the clerk 1 can automatically view a contract created by "salesperson 1(K)", and cannot view the contract created by "salesperson 1(A)", because after the role to which A is related has changed, A becomes a historical related role of the salesperson 1), the clerk 1 can view contracts created by "salesperson 2(D)" and "salesperson 2(E)", and the clerk 1 can modify contracts created by "salesperson 3(F)" and "salesperson 3(G)".

The operation permission includes one or more operations of viewing, modifying, adding, deleting and printing form data.

In another embodiment, the null option and the unrestricted option are displayed when all roles in the system are displayed; if the null option is selected, the operation permission is authorized to form data in which the field value of the authorized field in the form is null; if the unrestricted option is selected, the operation permission is authorized to form data in which the field value of the authorized field in the form is any value (including null). In the present invention, the unrestricted option is set, and if the unrestricted option is selected, the operation permission is authorized to form data in which the field value of the authorized field in the form is any value, thus improving the efficiency of authorizing a grantee having the operation permissions of all form data of the authorized field.

When there is one grantee, after a form is selected, the grantee's current form-operation permissions in the form are displayed.

Embodiment 3

As shown in FIG. 9, an authorization method based on form data gotten by a role includes: selecting one or more grantees. The grantee includes one or more types of a person, a user, a group, a class, and a role. The role is an independent individual not a group/a class, one role can only be related to a unique user during the same period, and one user is related to one or more roles.

The role belongs to a certain department, and the role is authorized according to the work content of the role; the name of the role is unique under the department, and the number of the role is unique in a system. The user determines (obtains) permissions through its relation to the role, one employee corresponds to one user, and one user corresponds to one employee.

During cross-department transfer of the user, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

The form is selected, and the authorized field used for searching form data is displayed, where the authorized field is a field, the field value of which includes a role, where the role is an independent individual not a group/a class, one role can only be related to a unique user during the same period, and one user is related to one or more roles.

Each authorized field is authorized respectively: all roles in a system are displayed, where the role is an independent individual not a group/a class, one role can only be related to a unique user during the same period, and one user is related to one or more roles; the role that needs to be used for searching form data is defined as a target role, where one target role corresponds to one role; and for each target role of each authorized field, the set of form data, the target role of which is included by a field value of the authorized field in the form is gotten respectively, and the operation permission is authorized to the set. As shown in FIG. 10, the authorized field "creator" includes target roles "salesperson 1, salesperson 2, salesperson 3"; the set of form data in which the creator is the salesperson 1 is gotten, and the viewing permission is authorized to the set; the set of form data in which the creator is the salesperson 2 is gotten, and the viewing permission is authorized to the set; the set of form data in which the creator is the salesperson 3 is gotten, and the modification permission is authorized to the set.

The operation permission includes one or more operations of viewing, modifying, adding, deleting and printing form data.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. An authorization method for form data acquired based on a role, comprising:
    selecting one or more grantees;
    selecting a form, and displaying a form field for searching form data;
    displaying one or more roles in a system;
    selecting a role in the system as a target role for searching form data;
    selecting a target object for the target role, wherein said target object is a current object, a historical object, or one of all objects, wherein said current object is a user currently related to the target role, said historical object is one of users who have been related to the target role except the user currently related to the target role, and said all objects are all users who have been related to the target role; and
    getting a set of form data corresponding to a user of the target object in one or more field values of the form field; and
    authorizing said one or more grantees an operation permission for the set of form data, wherein the one or more grantees comprise a role, wherein each role is configured to be related to a single unique user during same period and any other user cannot be related to the same role during the same period, the user is configured to be related to the one or more roles, and the user is configured to obtain the operation permission of the related one or more roles.

2. The authorization method according to claim 1, wherein said operation permission comprises one or more of viewing, modifying, adding, deleting or printing the set of form data.

3. The authorization method according to claim 1, wherein said role is configured to belong to a department, the role is authorized according to the work content of the role, the name of the role is unique under the department, and the number of the role is unique in the system.

4. The authorization method according to claim 2, wherein during a cross-department transfer of said user, the user's relation to the role in an original department is canceled, and the user is related to a new role in a new department.

5. The authorization method according to claim 1, wherein a null option is displayed when all roles in the system are displayed, and if the null option is selected, the operation permission is authorized for the set of form data in which the field value of the authorized field in said form is null.

6. The authorization method according to claim 1, wherein an unrestricted option is displayed when all roles in the system are displayed, and if the unrestricted option is selected, the operation permission is authorized for the set of form data in which the field value of the authorized field in said form is any value.

7. The authorization method according to claim 1, wherein the one or more field values of the form field comprise one or more users.

8. The authorization method according to claim 1, wherein the one or more field values of the form field comprise a role and a user.

9. The authorization method according to claim 8, further comprising:
    after selecting the target object for the target role, designating a user of the target object as a limiting value of the target role; and
    getting the set of form data corresponding to the limiting value of the target role in the one or more field values of the form field.

* * * * *